: US 7,106,411 B2
(45) Date of Patent: Sep. 12, 2006

(12) United States Patent
Read et al.

(10) Patent No.: US 7,106,411 B2
(45) Date of Patent: Sep. 12, 2006

(54) CONVERSION OF CINEMA THEATRE TO A SUPER CINEMA THEATRE

(75) Inventors: Steven Charles Read, Mississauga (CA); Brian John Bonnick, Oakville (CA); George Eric Jacques, Freelton (CA)

(73) Assignee: Imax Corporation, Ontario (CA)

( * ) Notice: Subject to any disclaimer, the term of this patent is extended or adjusted under 35 U.S.C. 154(b) by 0 days.

(21) Appl. No.: 10/839,665

(22) Filed: May 5, 2004

(65) Prior Publication Data

US 2005/0248726 A1 Nov. 10, 2005

(51) Int. Cl.
*G03B 21/32* (2006.01)
*G03B 37/00* (2006.01)

(52) U.S. Cl. .......................................... 352/40; 352/69
(58) Field of Classification Search ................ 352/1, 352/5, 11, 38, 40, 69, 6, 8, 9
See application file for complete search history.

(56) References Cited

U.S. PATENT DOCUMENTS

| | | | |
|---|---|---|---|
| 2,298,618 A | 10/1942 | Garity et al. | |
| 5,414,558 A | 5/1995 | You | |
| 5,469,669 A * | 11/1995 | Alter | 52/8 |
| 6,084,654 A | 7/2000 | Toporkiewicz et al. | |
| 6,191,886 B1 | 2/2001 | Sinkoff | |
| 6,407,798 B1 * | 6/2002 | Graves et al. | 352/69 |
| 6,501,599 B1 | 12/2002 | Randolph et al. | |
| 6,624,873 B1 * | 9/2003 | Callahan et al. | 352/27 |

FOREIGN PATENT DOCUMENTS

| | | |
|---|---|---|
| CA | 2 024 570 C | 3/1991 |
| CA | 2 024 571 C | 3/1991 |
| CA | 2 282 286 A1 | 9/1998 |

OTHER PUBLICATIONS

Belton, *"Widescreen Cinema,"* Harvard University Press, Cambridge, Massachusetts, Preface, Contents, Chapter 2 "From Novelty to Norm," pp. 34-51; Chapter 3 "Wide Film and the General Audience," pp. 52-68; Chapter 5 "Cinerama: A New Era in the Cinema," pp. 85-112 (1992).
Cohn, "Audio For Theatrical Surroundings," *Post*, 5 pages (Sep. 1993).
Gainsborough, "Preparing for Digital Sound," *Cinema Technology*, vol. 6, No. 1, 3 pages (Oct. 1992).
Garity and Hawkins, "Fantasound," *Journal of the Society of Motion Picture Engineers*, (Aug. 1941) http://www.widescreenmuseum.com/sound/Fantasound1.htm.
Hull, "Surround Sound Past, Present, and Future," Dolby Laboratories, Inc. S94/9835/10133, pp. 1-6 (1994).
Karagosian, "Multichannel film today," *S&VC*, pp. 52-59 (Feb. 2000).
Kaufman, "Salute to Dolby Laboratories on its 30th Anniversary A Sound Business," *The Hollywood Reporter*, 4 pages (May 16, 1995).

(Continued)

*Primary Examiner*—Rodney Fuller
(74) *Attorney, Agent, or Firm*—Dean W. Russell; Kilpatrick Stockton LLP

(57) ABSTRACT

Methods of and equipment for converting existing standard motion picture theatres to one having highly immersive, large fields of view are addressed. Aspects of the methods including moving motion picture screens closer to the audience and employing different projection equipment to avoid or minimize appearance of unrealistic or non-natural image artefacts. Alternative sound systems too are detailed.

44 Claims, 5 Drawing Sheets

OTHER PUBLICATIONS

Marshall, "Making Movies CinemaScope® The 'Poor Man's Cinerama® ," *Widescreen Review*, Issue 26, pp. 114-116 (Dec. 1997).

Mayfield, "Sound Ideas The Loudspeaker Evolution New Designs Accommodate Today's Stadium Theatres," *Film Journal International*, pp. 38, 40, 62 (Oct. 2000).

Reber, "Making Moves Sound Wars At A Theatre Near You Round Three: Politics And Numbers," *Widescreen Review*, pp. 73-75 (Nov./Dec. 1993).

Sun, "Making Movies The History of Cinema Sound," *Widescreen Review*, Issue 30, pp. 90, 93-95 (Jan. 1999).

Sunier, "Making Movies As Wide And As Deep As It Gets The New 3D Image And 3D Binaural IMAX," *Widescreen Review*, Issue 26, pp. 117-124 (Dec. 1997).

Cinema Digital Sound Technical Data Sheet, Eastman Motion Picture Films, Optical Radiation Corporation, one page (undated).

"Theater's arrival expands film-going experience" http://www.statenews.com/article.phtml?=pk=21046 (Byron) Nov. 25, 2003, paragraph 11.

IMAX Corporation Investor Relations Press Release http://www.corporate-ir.net/ireye/ir_site.zhtml?ticker=IMAX&script=410&layout=-6&item_id=387408(Imax) Mar. 3, 2003.

International Search Report issued in corresponding PCT/IB2005/001216 dated Aug. 31, 2005.

IMAX Systems Corporation drawing entitled "IMAX Theatre Proposal Theatre Geometry Using C287 Lens" dated Dec. 8, 1980 (one sheet).

* cited by examiner

CONVERSION OF CINEMA THEATRE TO A SUPER CINEMA THEATRE

FIELD OF THE INVENTION

The field of the invention is the presentation of motion picture films, and in particular in the cost effective conversion of a standard, existing multiplex theatre space into one allowing a qualitatively different motion picture presentation experience.

BACKGROUND

Motion picture exhibition has seen a number of changes since its inception in the late $19^{th}$ century. Generally, the main variables in motion picture exhibition have been the dimensions of the theatre enclosure and correspondingly the number of seats therein, the size of the screen upon which images were projected and the dimensions or format of the film negative which contained the images for presentation. Although a number of film formats were considered, one format, 35 mm wide film having an image aspect ratio of 4:3 became the industry standard. Motion picture theatres gradually evolved in size from smaller theatres to larger so-called palace theatres featuring several hundred to thousands of seats, balconies, and elaborate facades. Despite the impressive and somewhat regal atmosphere these theatres continued to feature 35 mm film projected onto narrow width screen. Eventually in the late 1920s, motion picture producers and exhibitors started experimenting with larger film formats which could enhance the visual immersion of theatre patrons and live up to the size and scope of the large palace theatres.

Some of the wide gauge/wide screen processes that appeared to challenge the 35 mm film standard included Magnascope, Polyvision, Hypergonar and Fox Grandeur. Magnascope used a novel magnifying lens to enlarge a standard 35 mm frame. Polyvision used multiple 35 mm film projectors to stitch together a composite image, while Fox Grandeur replaced 35 mm film entirely with a new 70 mm wide film format.

Finally Hypergonar used a novel method of anamorphically squeezing images onto a 35 mm frame during filming and then reversing the process upon projection to fill a larger projection screen.

Although technically and aesthetically successful, the proposed wide screen systems failed to replace 35 mm as a film standard in the economically depressed 1930s and were soon abandoned. Conditions had changed somewhat by the early 1950s and the motion picture industry saw a resurgence of proposals for wide gauge/wide screen systems. Foremost among the new systems were Cinerama, a multiple 35 mm projection system, Cinemascope, an anamorphic system, Vistavision a 35 mm 8 perforation format system and Todd AO, a wide gauge system using a 70 mm 5 perforation 30 frame per second format. The new formats were successful at the box office and survived for a number of years, but none was able to seriously challenge the 35 mm film standard.

A third wave of wide gauge/wide screen motion picture exhibition started in 1969, led by IMAX Corporation, which featured the use of horizontally travelling 70 mm film with a film frame of 15 perforations in width resulting in an image area about ten times that of standard 35 mm. In addition to the large film format IMAX® re-conceptualized the theatre viewing space by providing significantly larger screens which extended beyond spectators fields of view, steeply raked seating area to give unobstructed viewing of said large screen, and high fidelity six channel sound to surround the audience. The net result of these advances was a theatre experience in which audience members were immersed in image and sound as never before. IMAX® theatres were successful in the institutional and exhibit marketplace. Other competing large format systems include Showscan's 70 mm 5 perforation film projected at 60 frames per second (versus the standard 24 fps) and Iwerk's 70 mm 5, 8 and 15 perforation film systems.

In most cases IMAX® systems were installed in custom designed motion picture theatres having a large volume to house both the large screen and a steeply raked seating deck. Occasionally IMAX® projection systems were placed in large hall converted stage theatres. IMAX® screens could be placed in front of the stages in such theatrical structures without building structure modifications because of the large existing clear height. In some cases, such as at the Museum of Natural History in New York City, a retractable IMAX® screen was placed in front of the stage that had an existing 35 mm screen at the back of the stage. Some seats at the side of the theatre near the position of the IMAX® screen were removed because the visual quality at those locations was poor. The slope of the seating areas in these theatrical theatres is typically shallow, and financial constraints prevented conversion to a more desirable steeper slope. As a result, the viewing conditions in such converted theatres were not optimized for viewing IMAX® motion pictures.

Grand theatres of the type frequented in the 1920s thru 1950s were sometimes converted to house the emerging wide gauge/widescreen systems of the 1950s. Conversion consisted of changing the width and curvature of the screen to match the new wider picture aspect ratio and removing a relatively high percentage of seats that no longer had viable viewing conditions. Screen centres were basically positioned at the original screen centre position at the rear wall of the theatre, and the rake of seats in the theatres was not a consideration in the conversion process.

Another type of theatre conversion addresses the desire to present motion pictures in either of two common aspect ratio formats, which are 1:85:1 and 2.35:1. The conversion process involves adjusting the curtain masking around the screen to suit the format of presentation as well as changing the lens and aperture plate. The position of the screen itself does not change.

A major trend in the motion picture industry starting in the 1970s was to group a number of small 35 mm film theatres into one large complex, or so-called multiplex theatre. These theatres, although profitable, did not provide patrons with a quality viewing experience. Over time movie attendance declined partly because of new home entertainment technologies such as cable TV, video cassette recorders, and home movie rentals. In the 1990s the motion picture exhibition industry responded to declining movie attendance by building new theatres offering stadium seating—placing each row of seats on its own tier—to improve the sight lines and thus the viewing experience of patrons. This industry advance has been very successful in improving movie attendance and is now an expected feature for theatre patrons; conventional low slope seating decks are seen as "old" and inferior. (LA Business Journal). The new stadium seat theatres, while an improvement over traditional multiplex theatres, still rely on standard 35 mm film projectors and do not provide patrons with a wide field of view or highly immersive experience.

It should be noted that in the later half of the 1990s the use of digital projectors began in a few multiplex cinemas. This trend in time will increase as digital projection systems get better in quality and higher in image resolution.

Another aspect of the conversion is to improve the quality of the audio portion of the immersive experience in a multiplex type theatre. Sound systems for cinema have evolved over the decades and the trend continues as an ongoing effort to attract the paying viewer. The surround sound systems used in today's Multiplex theatres can provide a degree of "ambience" in the audio experience but these systems still lack the ability to create realistic immersive audio.

From the time "talkies" were introduced, motion picture cinemas had "monaural" sound systems, having only one loudspeaker located behind the center of the screen. The sound experience in such a cinema was very one dimensional and flat, with no ability to simulate sounds coming from directions other than the center of the picture. In order to improve the audio experience, cinema designers and equipment suppliers experimented with a variety of multiple loudspeaker ("multi-channel") schemes designed to immerse the audience in a sound field which could add to the "suspension of disbelief" desired by filmmakers. One of the earliest attempts at multi-channel sound was the premier of Walt Disney's "Fantasia" in 1939. Disney experimented with a number of sound system loudspeaker configurations as outlined in an article by William E. Garity and John N. A. Hawkins published in the August 1941 issue of the journal of the SMPTE. The last two versions of the Fantasound system, known as Mark IX and X, used 5 loudspeakers and sound from 3 separate tracks. The loudspeakers were positioned such that 3 were behind the screen (i.e. left, center, and right) and one loudspeaker was in each rear corner. The two sets of rear corner loudspeakers were switched in to supplement or replace the corresponding left and right front loudspeakers at select times during the picture presentation. Unfortunately, the war and economics cut short Disney's sound system experiments. In the early 1950's, Cinerama brought multi-channel sound to the forefront again with 5 to 7 loudspeaker channels located around the audience.

During the 1950's there were several theatres equipped for the playback of multi-channel sound, of which there were primarily two formats both using magnetic stripes printed on the film. The CinemaScope 35 mm film format provided four discrete channels, consisting of 3 loudspeakers behind the screen and a monaural surround channel provided by several small loudspeakers located on the side and rear walls of the cinema. These surround loudspeakers provided a degree of "ambience" to the sound experience in combination with the directional sound produced by the 3 screen loudspeakers, and thus added to the immersive effects presented to the audience. The Todd-AO 70 mm film format added two additional loudspeakers behind the screen, Left Center and Right Center, between the center loudspeaker and the left and right speakers.

In the 1970's, Dolby pioneered several advances in cinema sound, including extended low-frequency sound (subbass), noise reduction, and Stereo Optical sound. Dolby Stereo Optical provided 4 channels of sound (left, center, right, and mono surround) using an encoding technique to store the analog soundtrack on two analog optically printed stripes on the film. This became the standard for normal cinemas, and remains in use today in non-digital cinemas.

In 1979, Dolby added to the immersive effects of cinema sound by developing stereo surrounds, in which the left distributed loudspeaker channel could reproduce different sounds than the right channel. But, the surround effects were still effectively ambience sounds, and were unable to reproduce directionality with any precision due to the distributed configuration of the surround loudspeakers.

In the 1980's, IMAX® Corporation standardized on a 6-channel sound system with a discrete surround sound configuration and a separate sub-bass channel for IMAX® Theatres. This type of system provides substantially better sound imaging by utilizing custom-designed loudspeakers located in each rear corner behind the audience, each powered by a separate audio channel. The immersive effects of this type system are much more impressive, and allow the filmmaker the ability to position sound more precisely—directly in front of, in front above, around, and behind the audience.

In 1987, Imax installed the first Digital Sound Reproducer in an IMAX Theatre. By 1990, uncompressed Digital Sound was available to all IMAX Theatres. Also in 1990, with the release of the movie "Dick Tracy," CDS uncompressed digital sound on 35 mm film was introduced to the general cinema industry by a joint venture of Orcon and Kodak. Because CDS was not compatible with standard optical sound on 35 mm film, the CDS format was discontinued soon thereafter.

Between 1992 and 1993, three systems of digital sound for cinema were released—Dolby Digital, DTS, and Sony SDDS. All three of these formats utilized some form of digital compression to reduce the storage requirements (on CD-ROM for DTS) or to allow the digital audio signal to be printed on the 35 mm film (with Dolby Digital and SDDS) without displacing the optical track as did the CDS system. While these systems use different compression techniques—some considered "better sounding" than others—IMAX Digital Sound remains the only uncompressed digital cinema sound format in general use today.

All three of the digital sound systems used in conventional 35 mm and digital cinemas make use of the same distributed side and rear surround loudspeakers to create a sense of ambience for the film soundtrack. Even though these digital systems may sound "better" than the older optical systems, sound immersion remains limited due to the inability of multiple distributed loudspeakers to provide precise directionality and image placement.

Motion picture exhibitors have expressed interest in providing additional quality improvements to mainstream motion pictures by adding a special, custom designed, smaller scale Imax theatre to their multiplexes. This has proved popular with patrons and exhibitors, but has not been widely adopted because of high costs associated with constructing the adjunct theatre.

It is desirable to be able to provide mainstream multiplex theatres with the same manner of widescreen presentation experience as large hall custom designed theatres, but at a lower, more affordable cost. There is a need to be able to economically convert an existing mainstream multiplex motion picture theatre into a widescreen theatre that is qualitatively superior in terms of projected image quality, field of view, and of a more realistic immersive audio experience that does not exist in multiplex type theatres. As a result of having overbuilt the number of multiplex theatres the economics of this situation dictates that converting existing multiplex theatres makes better sense than building additional new multiplexes with larger screen sizes. The following discussion of the inventive approach by the applicant addresses this need.

SUMMARY OF THE INVENTION

The invention is a method of cost effectively converting an existing standard motion picture theatre, such as the multiplex theatre that uses film/digital projection, to a highly immersive, large field of view motion picture theatre. Hereinafter the term "multiplex theatre" is used in a more general sense to represent all motion picture theatres that are: not the Grand Theatre hall sizes of the 1920s, not the theatrical stage theatres, and not the IMAX geometry theatre halls originally built for Imax presentations. The inventive method includes:

moving the motion picture screen closer to the audience to increase the field of view; and employing projection means to improve the quality of images on the screen such that the audience does not see unrealistic or non-natural image artefacts which would occur by just simply magnifying the existing projected image.

In some situations, carrying out the first step may inadvertently block access to an existing emergency exit door necessitating an additional step of moving a portion of the screen to allow access to the emergency exits.

To cost effectively convert a multiplex theatre sound system so that a realistic audio immersion experience is created may involve the following:

changing the loudspeaker configuration to one that uses 5 discrete loudspeakers with Proportional Point Source technology and one sub-bass loudspeaker; and driving each loudspeaker from a separate sound channel; with the sound system using a 5.1 sound track that is mixed differently than standard cinema 5.1 sound track and the sound system using uncompressed digital sound with a resolution of 16 bits or greater.

DETAILED DESCRIPTION OF THE DRAWINGS

Figure 1:
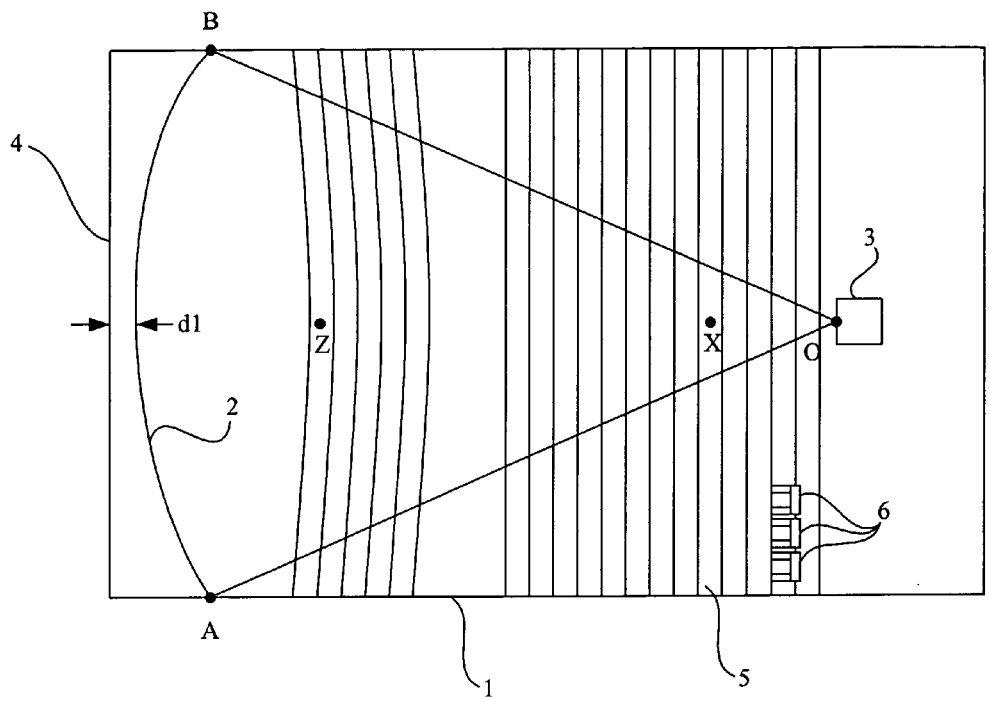
FIG. 1 is a plan view of a typical multiplex theatre.

Referring now to FIG. 1, a plan view of a typical 35 mm film and/or digital multiplex theatre is depicted at 1. Theatre 1 includes a front projection screen 2, motion picture projector 3, a theatre enclosure rear wall 4, a seating deck 5 upon which there are seats for spectators 6. The distance d1 indicates the distance from the centre of screen 1 to the inner surface of rear wall 4. The space between the screen and the rear wall is occupied by a screen support structure (not shown) and sound system speakers (also not shown). Angle AOB represents the horizontal field of view of the motion picture theatre as seen from a location coincident with the point of projection, O. In the case of FIG. 1, this angle equals approximately 45 degrees. This represents a minimum horizontal field of view for patrons in the theatre; as one sits closer to the screen the horizontal field of view increases. A patron sitting at position X in FIG. 1, for example, would have a horizontal field of view of 55 degrees, as is indicated by angle AXB. The widest possible field of view in a theatre such as depicted in FIG. 1 is indicated by the angle AZB representing a patron sitting in a seat in the front row, and is equal to about 110 degrees. It must be noted however that in a typical multiplex cinema theatre the visual quality of images when viewed from a close position, like point Z in FIG. 1 is not as good when seated further back. In the close-up seats unnatural visual defects such as insufficient image resolution, film grain, visible pixels, blurred edges, and image unsteadiness are more easily perceived. Generally, patrons in these theatres tend to sit further from the screen when given the opportunity where image defects are less apparent.

Figure 2:
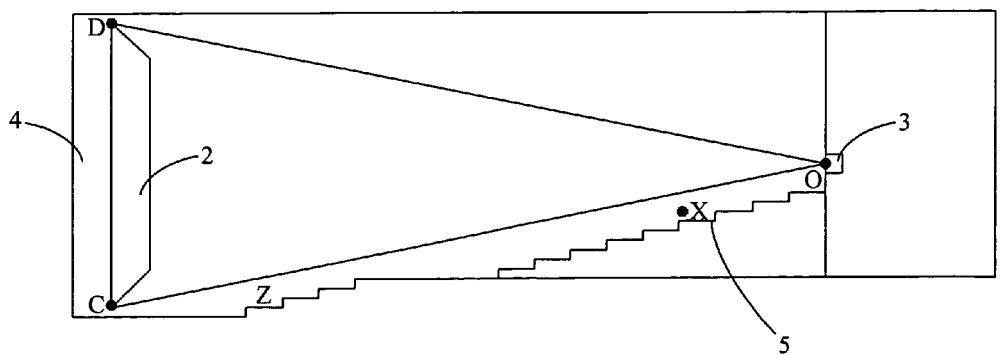
FIG. 2 is an elevation view of a typical existing theatre.

FIG. 2 illustrates an elevation view of multiplex cinema theatre 1. It can be seen that screen 2 is less than the full height of the theatre with observable gaps above the upper edge of the screen and below the lower edge of the screen. These gaps would be covered up by dark curtains or similar observant material to help conceal the limited vertical extent of screen 2. Angle COD represents the minimum vertical field of view in a theatre of this geometry and is equal to about 20 degrees. As one moves closer to the screen, the vertical field of view increases, as one would expect. At position X the vertical field of view is about 25 degrees while at position Z, it is about 50 degrees. It can be seen that seating deck 5 is sloped at an angle of about 20 degrees in the rear portion of the theatre and about 15 degrees in the section closer to the screen. This slope, or rake, of seating deck 5 allows each row of seats to be located on a separate platform thereby giving patrons a clear vertical field of view of the entire screen.

The horizontal and vertical fields of view available to patrons in a typical multiplex theatre are significantly below the capabilities of the human visual system, which is estimated to have a recognizable horizontal field of view of 120 degrees and a vertical field of view of about 70 degrees. The estimated perceptual field of view is about 200 degrees horizontally and 135 degrees vertical.

Figure 3:
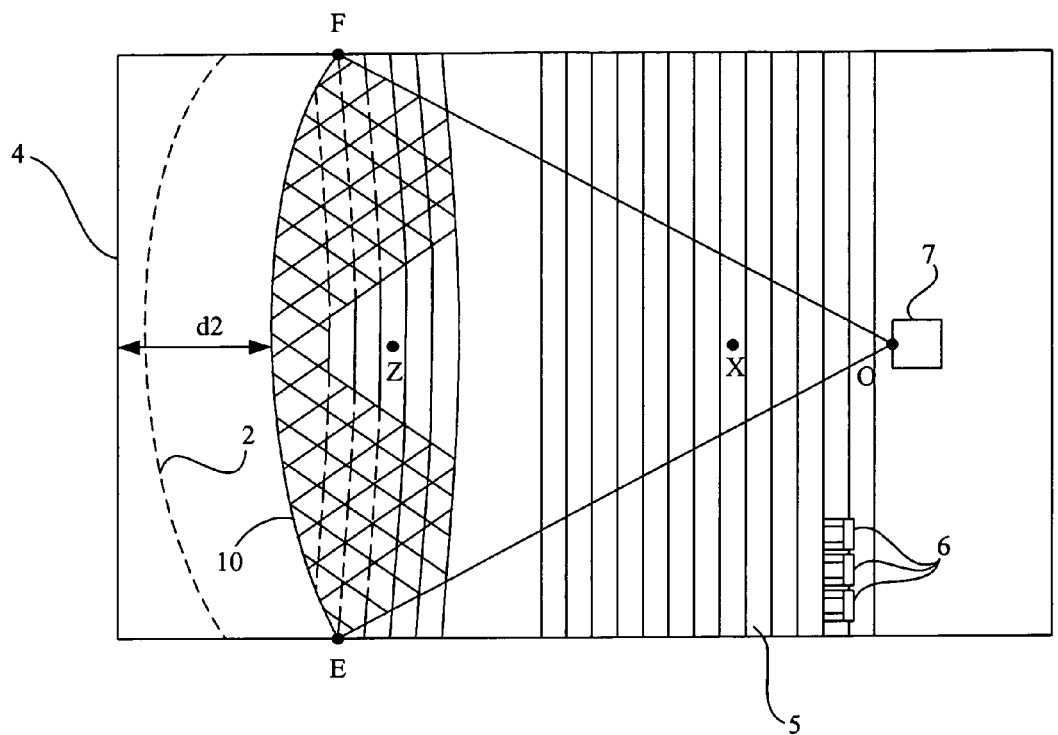
FIG. 3 is a plan view of a multiplex theatre after conversion.
Figure 4:
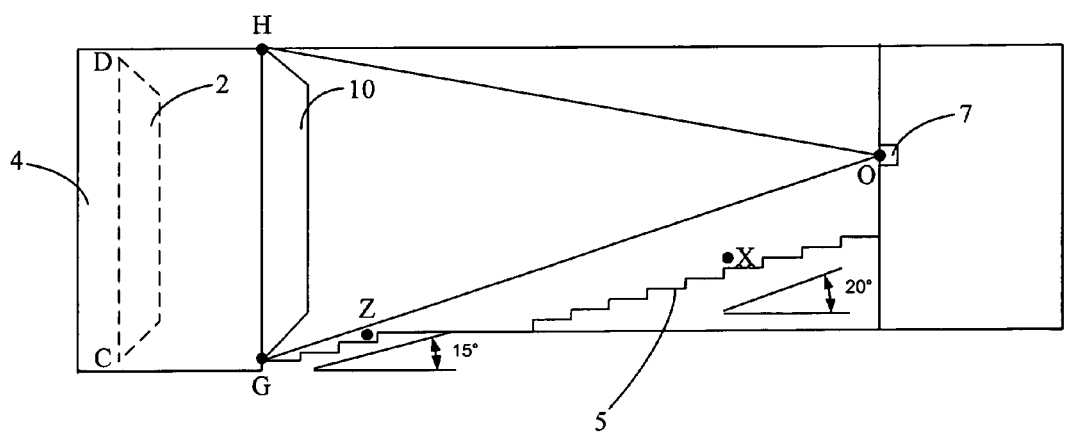
FIG. 4 is an elevation view of a multiplex theatre after conversion.

Referring now to FIG. 3, the same multiplex cinema theatre is shown after conversion to an improved, more visually immersive motion picture theatre. Screen 2, shown in outline, has been removed and replaced by a new, larger screen 10 which is now located at a new distance, d2, from rear wall 4. Screen 10 extends from wall to wall, and as shown in FIG. 4, extends from floor to ceiling. The hatched area in the lower part of seating deck 5 in FIG. 3 represents seats that have been removed to accommodate the new screen and viewing geometry of the improved theatre. A new projector 7 replaces the standard multiplex cinema projector and is capable of projecting images with superior quality in terms of resolution, sharpness and steadiness.

The minimum horizontal field of view of the improved theatre is now about 55 degrees, while the minimum vertical field of view is about 30 degrees. At position X, the horizontal field of view is about 75 degrees and the vertical field of view is about 40 degrees. At position Z the horizontal field of view is about 130 degrees and the vertical field of view is about 80 degrees. To a viewer sitting at the seat closet to the screen centre, the new screen position and size appears 115% larger than the conventional screen size. To the viewer sitting at the position X in the theatre with the new screen position and size the screen size appears to have increased 100%. To the viewer sitting at the rear most position of the theatre with the new screen position and size the screen size appears to have increased 85%. The viewer in position X, when the screen has been moved forward, experiences an increase in image angular FOV of about 35% horizontally and 60% vertically. The increase in vertical FOV is especially significant and is an improvement that until now has been largely overlooked by the prior art traditional cinema system advances such as Cinerama which concentrated on expanding horizontal FOV. The increased FOV, both vertical and horizontal, is an important presentation improvement resulting from the inventive method of theatre conversion.

It is possible to only increase the image fidelity of the projection system such that the viewers see the same fidelity of image on the forward moved screen as when the screen was positioned prior to the conversion. This would mean that viewers in the first few front row seats in the converted theatre would experience the same quality of image prior to the conversion that was already marginally low, hence, one reason viewers move further back in the theatre. The most evident image fidelity issues of front row viewing are lack of image resolution, the presence of film grain artefacts becoming apparent, or in the case of digital projection, image pixels becoming apparent. Other factors only associated with conventional film projectors that specifically contribute to image contrast MTF degradation are film transport unsteadiness and softening of film image due to heat pop of the film. In the theatre conversion front row seats have been removed, so there are fewer seats in the theatre. To give front row seats a more acceptable viewing experience the image projection fidelity can be further increased so that the front row viewers now get the same or better image quality as the viewers seated further back from the screen prior to the conversion.

In the preferred embodiment one type of projector that uses film with a larger image area and does not suffer from image unsteadiness or film heat pop associated with conventional cinema film projection systems is the rolling loop projection system.

The combination of improved image quality on the screen with increased horizontal and vertical fields of view significantly improves the sensation of visual immersion in the images. Applicant has confirmed through research studies in perception and cinema viewer's preferences, the improvement in the presentation of the converted theatre is significantly better than the presentation in a standard multiplex cinema theatre.

In addition to significantly improving image quality and the enhancing the feeling of immersion in 2D images, the wider fields of view provided by the inventive method of theatre conversion is necessary for proper and realistic immersive experiences of 3D motion picture presentations.

In some multiplex theatre designs emergency exits are at the screen end of the theatre on the side wall. These exits could be blocked by the new position of the screen in a converted theatre. This situation may not be acceptable by local safety regulations. The inventive conversion method addresses this possibility by inclusion of an emergency screen access system consisting of a system door and means for automatic activation of said door. FIGS. 5 through 8 illustrate one embodiment of such a system.

Figure 5:
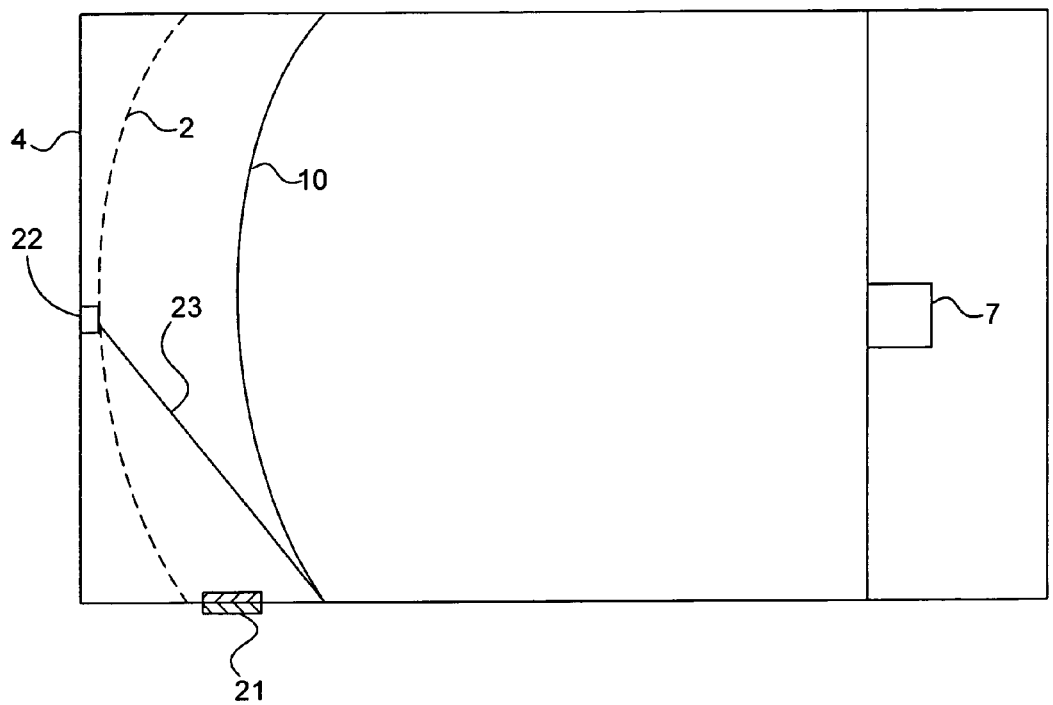
FIG. 5 is a plan view of a converted multiplex theatre illustrating a novel emergency exit access system.
Figure 6:
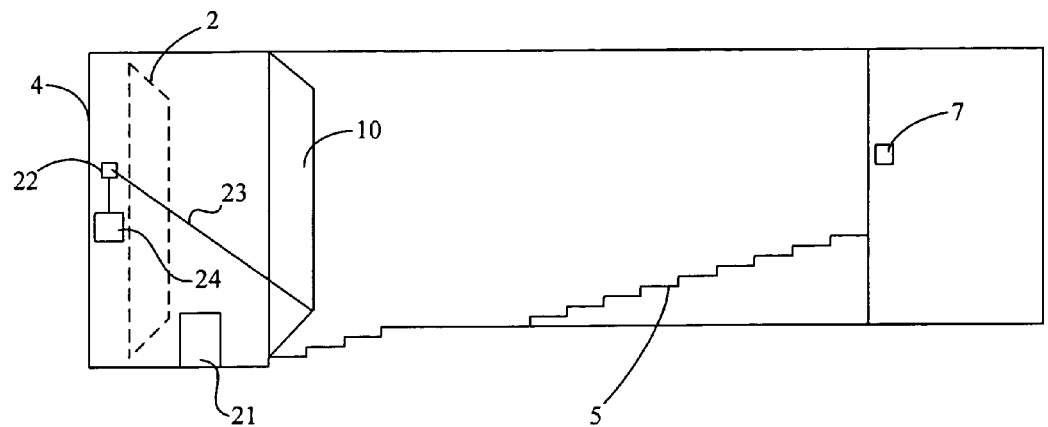
FIG. 6 is an elevation view of a converted theatre illustrating a novel emergency exit access system.
Figure 7:
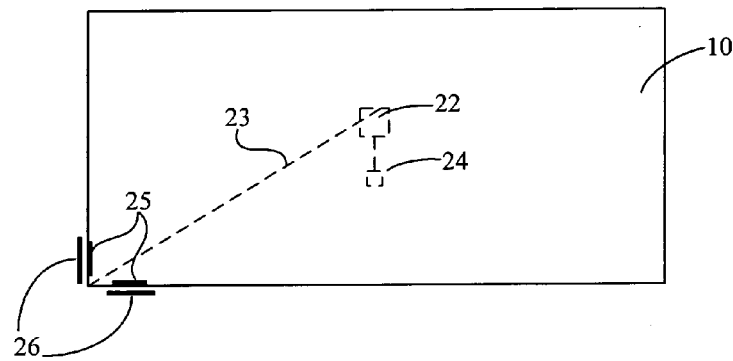
FIG. 7 is a front view of the screen in a converted theatre illustrating the novel emergency exit access system in a normal state.
Figure 8:
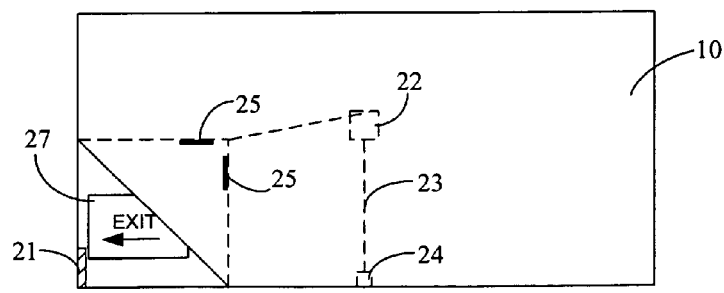
FIG. 8 is a front view of the screen in a converted theatre illustrating the novel emergency exit access system in an activated state.

Referring now to FIGS. 5 and 6, an emergency exit door 21 which was located in front of original screen 2, shown in outline, is now located behind new screen 10. Motion picture screen 10 consists of a perforated, pliable projection surface material such as vinyl which is supported and stretched by a frame (not shown) located behind the projection surface. FIG. 7 illustrates schematically how one corner of projection screen 10 is not fastened rigidly to a supporting frame, but is held in place by the magnetic attraction between metal rods 25 in the edges of screen 10 and electromagnetic means 26 attached to the wall and floor of the converted motion picture theatre. A cable 23 is attached to the rear corner of the projection surface of screen 10. The other end of cable 23 is attached to a counterweight 24 after first passing over a pulley 22 attached to the rear wall surface 4. In an emergency situation, an automatic activation means sends a signal to electromagnets 22 switching them off thereby removing the magnetic force which had been holding the metal rods firmly against the wall and floor of the theatre. The corner of the projection surface of screen 10 is then pulled backwards and upwards by the counterweight as it falls by gravity towards the ground. FIG. 8 depicts the system door to the emergency exit in an activated position with the corner of screen 10 pulled upwards and backwards and counterweight 24 resting on the ground. An illuminated sign is shown at 27 directs patrons to the newly revealed emergency exit 21. Winching means, not shown, is used to pull up the counterweight so that the system and screen can be reset after it has been activated.

The activation signal may be effected by a number of activation systems, separately or in parallel, including a mechanical swing gate crash bar located at the bottom aisle stairs, pushing or applying pressure to the screen surface, by a signal from the building emergency alarm system, a manual release button at the usher station, or by a patron activated motion, IR or touch pad sensor near the vicinity of the corner of screen.

In addition to the potential necessity of using the emergency screen access system there are other negative consequences associated with the inventive method of multiplex theatre conversion that must be remedied or accepted including the creation of a large sound cavity behind the new screen assembly, and the necessity to remove a number of seats near the front of the theatre which are too close to the new screen for effective viewing. The first problem is addressed by the provision of a sound absorbing acoustic wall behind the new screen, that can be built inexpensively because it need not be a load bearing structural wall. If the sound barrier is forward of the theatre exit door an additional door would have to be built into the sound barrier. The second problem, seat removal, and the loss of revenue associated with those seats, is not overly detrimental to the success of the multiplex complex because a higher admission price can be charged for the remaining seats. In addition, it is believed that the premium quality and unique immersive experience offered by the new motion picture will lead to a higher, and sustained, level of theatre occupancy over its operating lifetime.

The conversion of a 35 mm film and/or digital projection multiplex theatre is not limited to the steps outlined above but can include further steps such as: tilting the screen forward or backwards with respect to the audience to increase the screen surface area in the vertical dimension or to compensate for keystoning or light reflection back to the audience; curving the screen in the vertical direction to provide a compound curved screen; or modifying the ceiling to provide additional vertical height for the new screen.

The conversion is also not limited to improving the quality of the visual experience but also converting the sound system to give a significantly more realistic and immersive audio experience. A truly immersive audio environment, similar to what the audience experiences in an IMAX® Theatre, is one in which the sound system has the ability to realistically position sound images in front of, around, and behind the audience. The converted sound system must be reasonably cost effective and at the same time create a realistic immersive audio experience for the majority of seats in the theatre. A conversion that does this is described below.

Figure 9A:
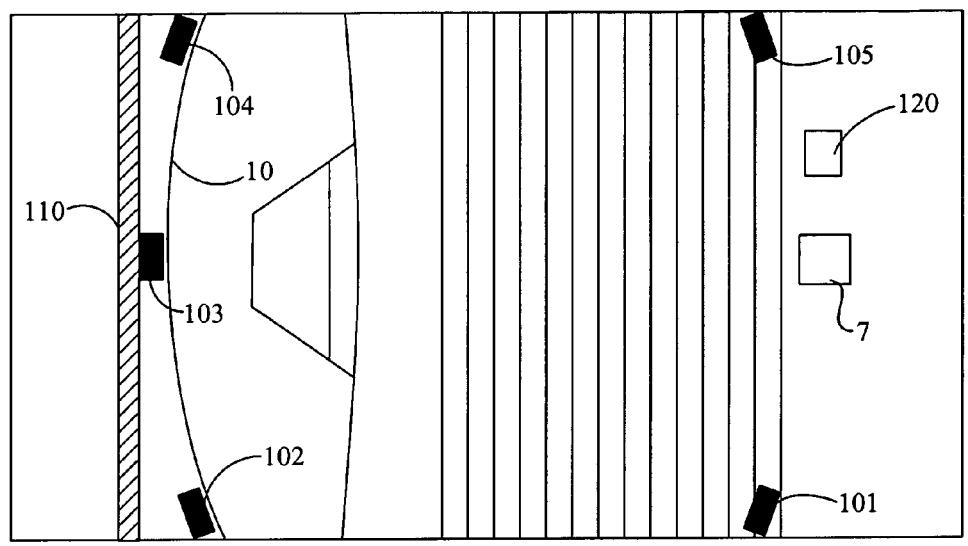
FIGS. 9a–9b are a plan view of a converted theatre and a front view of the screen illustrating the position of the PPS speakers.
Figure 9B:
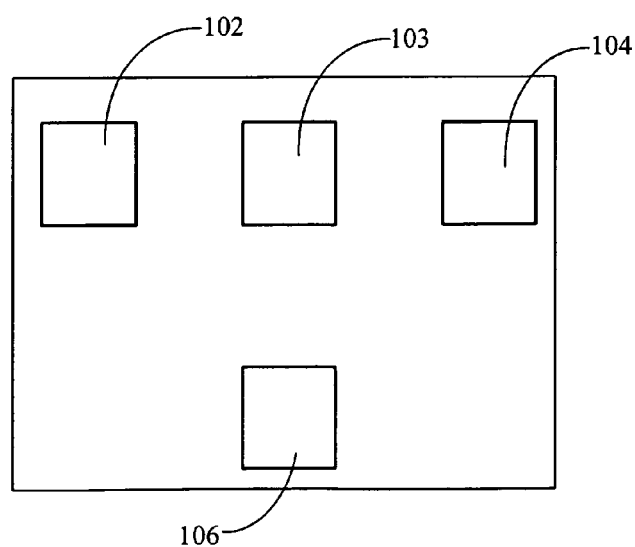

The theatre sound system is setup with a loudspeaker configuration as illustrated in FIGS. 9a and 9b. FIG. 9a is a plan view of the loudspeaker positions in a converted theatre and FIG. 9b is a front view of the loudspeakers behind the screen in a converted theatre. There are 5 loudspeakers 101, 102, 103, 104, and 105, each driven from a separate audio source, and each with appropriate amplification and equalization. There is a $6^{th}$ Sub-Bass Loudspeaker assembly 106 consisting of several sub-woofer elements grouped together that re-produce the low-frequency sound derived from the 5 audio channels. Powered with sufficient amplification these loudspeakers provide realistic sound levels for low-frequency sounds such as rocket launches, earthquakes, and explosions. Each audio channel is fed uncompressed digital sound with a resolution of 16 bits or greater from the Digital Sound Reproducer. The Digital Sound Reproducer is normally positioned in the sound rack 120 in the projection booth.

The loudspeaker positions in the theatre are referred to as: Left Rear 101, Left Screen 102, Center Screen 103, Right Screen 104, Right Rear 105 and the Sub Bass position 106. Loudspeakers 102, 103, and 104 in the front are positioned between the newly installed sound barrier 110 and the screen 10, part way between the screen base and top. Sub bass 106 is located between the sound barrier 110 and the screen 10 under Center Screen 103. The screen is perforated with tiny holes to let the sound through yet obscure speaker visibility. The complete sound system is designed to cover the entire audio spectrum and provide sufficient sound level within the theatre.

Loudspeakers 101, 102, 103, 104, and 105 are designed with Proportional Point Source (PPS) Technology. The principles of the physics used in PPS Loudspeaker technology is known to those skilled in the art. In general terms PPS Loudspeaker technology refers to the ability of a loudspeaker to direct proportionately more sound energy to seats farther away than that directed to the closer seats from a single or virtually single source position. Hereinafter this will be referred to as "PPS technology." In order to achieve optimum sound dispersion, PPS type loudspeakers must be designed for the specific theatre geometry. IMAX® Loudspeakers used in this conversion are designed with PPS Technology, using horns with asymmetrical dispersion patterns specifically designed to provide balanced sound distribution for multiplex cinemas having the appropriate geometry.

During installation each loudspeaker is placed, aimed, and aligned to position the sound dispersion pattern for maximum immersive effect. The alignment process involves use of computer aided design to determine the optimum loudspeaker "pointing angle" for each of the 5 loudspeakers in the theatre. Then, with the use of LASER alignment tools, the loudspeaker can be aimed to match the predetermined "pointing angle." A cinema sound system using PPS technology properly configured and equalized to the accepted industry standard, allows all theatre patrons to perceive sound from all channels as having essentially the same volume level and tonal quality. Thus, the sound "image" desired by the filmmaker is reproduced for the entire audience area. Surround sound systems that do not employ the use of PPS-type loudspeakers provide balanced sound, or a "sweet spot" for only a few seats—generally near the center of the theatre. Other patrons may hear only one or two loudspeakers predominantly, with little contribution from the other sound channels.

There are three significantly differentiating aspects of the converted sound system with respect to multiplex cinema sound systems. Not only has this type of immersive surround sound system conversion not been done before in multiplex theatres, there are differences that make the invented sound system conversion process truly unique.

The first differentiating aspect is that the sound system, as shown in FIGS. 9a–9b, uses discrete loudspeakers in the rear corners of the theatre with separate sound channels to provide the greater surround sound imaging capability. All conventional surround systems used in multiplex cinemas make use of distributed side and rear surround loudspeakers to create a sense of ambience but these lack the ability to provide precise sound directionality and sound image placement.

Secondly, in a sound system with 5 discrete PPS type loudspeakers and sound channels it becomes possible to place sound images in front of, around, and behind the audience. To optimize sound placement in a 5 channel discrete source sound system the 5 sound tracks must be re-mixed in order to provide the audience with a truly more realistic immersive audio experience. Multiplex Cinemas have not configured their sound system setup in this way before.

The third aspect relates to the Digital Sound Reproducer. As previously noted, other multiplex cinema sound systems utilize either optical analog audio tracks printed on the film, or one of three digital sound formats—all of which compress the digital audio by significant amounts in order to fit the storage/playback media. The Digital Sound Reproducer within the converted theatre uses uncompressed digital sound with a resolution of 16 bits or greater to provide all the audio resolution and dynamic range intended by the filmmaker and the film sound engineer.

The IMAX multiplex theatre converted sound system with its unique Digital Sound Reproducer will provide very high quality digital audio surpassing all other available cinema sound formats in fidelity, resolution, dynamic range and sound image placement capability. The result is sound unrivalled in achieving the goal of a realistic immersive cinema experience, and the "suspension of disbelief" desired by filmmakers.

The result of a multiplex theatre converted using some or all the steps described above creates for the audience a substantially improved realistic visual and audio immersion experience for 2D and 3D motion picture presentations. To date, this type of conversion has not been done before in multiplex theatres.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. A method of converting a multiplex theatre hall into an immersive motion picture theatre hall, comprising:
   a. providing a multiplex theatre hall comprising:
      i. a motion picture projector for projecting an image;
      ii. a first projection screen; and
      iii. at least one patron seat location;
   b. providing a second projection screen within the multiplex theatre hall, the first and second screens being configured for displaying the same presentation format of images; and
   c. projecting the image over a major portion of the second projection screen, increasing vertical field of view of the image for a patron sitting in a seat positioned at the at least one patron seat location and thereby creating an in immersive motion picture theatre hall.

2. A method according to claim 1 further comprising permanently disabling viewing of the first projection screen.

3. A method according to claim 1 in which the action of providing a second projection screen comprises providing an immovable frame for the second projection screen permanently located a fixed distance from the at least one patron seat location.

4. A method according to claim 1 in which (i) the multiplex theatre hall further comprises spaced first and second walls and (ii) the action of providing at least one patron seat location comprises providing at least two rows of patron seats extending the majority of the distance between the first and second side walls, the rows of patron seats being configured to provide stadium raked seating.

5. A method according to claim 1 in which the action of projecting the image over a major portion of the second projection screen comprises projecting an image having increased fidelity than an image projected onto the first projection screen either before or after the second projection screen is provided.

6. A method according to claim 5 in which the motion picture projector is a film projector.

7. A method according to claim 5 in which the motion picture projector is a digital projector.

8. A method according to claim 5 in which the motion picture projector is configured to project images for viewing by a 3D viewing system.

9. A method according to claim 8 in which (i) the action of projecting the image over a major part of the second projection screen also increases horizontal field of view of the image for the patron, (ii) the first projection screen has a first horizontal radius of curvature, and (iii) the action of providing a second projection screen comprises providing the second projection screen having a horizontal radius of curvature less than the first horizontal radius of curvature.

10. A method according to claim 5 in which (i) the action of projecting the image over a major part of the second projection screen also increases horizontal field of view of the image for the patron, (ii) the first projection screen is located a first distance from the at least one patron seat, and (iii) the action of providing a second projection screen comprises locating the second projection screen at a distance from the at least one patron seat less than the first distance.

11. A method according to claim 10 in which (i) the multiplex theatre hall has a rear wall, (ii) the action of providing at least one patron seat location comprises providing a forwardmost row of patron seats near the rear wall, (iii) the first projection screen has a first size, and (iv) the action of providing a second projection screen comprises providing the second projection screen having a size greater than the first size, further comprising disabling from use all of the patron seats of the forwardmost row of patron seats prior to projecting the image over a major portion of the second projection screen.

12. A method according to claim 1 in which the motion picture projector is configured to project images for viewing by a 3D viewing system.

13. A method according to claim 12 in which (i) the action of projecting the image over a major part of the second projection screen also increases horizontal field of view of the image for the patron, (ii) the first projection screen has a first horizontal radius of curvature, (iii) the action of providing a second projection screen comprises providing the second projection screen having a horizontal radius of curvature less than the first horizontal radius of curvature, (iv) the first projection screen is located a first distance from the at least one patron seat, (v) the action of providing a second projection screen further comprises locating the second projection screen at a distance from the at least one patron seat less than the first distance, (vi) the first projection screen has a first size, and (vii) the action of providing a second projection screen further comprises providing the second projection screen having a size greater than the first size, further comprising disabling from use all of the patron seats of the forwardmost row of patron seats prior to projecting the image over a major portion of the second projection screen.

14. A method of claim 13 in which the action of projecting the image over a major portion of the second projection screen further comprises projecting an image having increased fidelity than an image projected onto the first projection screen either before or after the second projection screen is provided.

15. A method according to claim 1 in which the entirety of the second projection screen is located no farther away from the at least one patron seat location than any portion of the first projection screen.

16. A method according to claim 1 in which the action of projecting the image over a major part of the second projection screen also increases horizontal field of view of the image for the patron.

17. A method according to claim 1 in which the multiplex theatre hal l has a rear wall and a front wall, the action of providing at least one patron seat location comprises providing a forwardmost row of patron seats near the rear wall and a rearmost row of patron seats near the front wall, and the action of projecting the image over a major part of the second projection screen increases the vertical field of view of the image for patrons sitting in the forwardmost and rearmost rows of patron seats.

18. A method according to claim 17 in which the action of providing at least one patron seat location further comprises providing a multiplicity of rows of patron seats between the forwardmost and rearmost rows and the action of projecting an image over a major part of the second projection screen increases the vertical field of view of the image for all patrons sitting in the patron seats of the multiplicity of rows.

19. A method according to claim 17 in which the action of projecting the image over a major part of the second projection screen also increases horizontal field of view of the image for the patrons sitting in the forwardmost and rearmost rows of patron seats.

20. A method according to claim 19 in which the action of providing at least one patron seat location further comprises providing a multiplicity of rows of patron seats between the forwardmost and rearmost rows and the action of projecting an image over a major part of the second projection screen increases the horizontal field of view of the image for all patrons sitting in the patron seats of the multiplicity of rows.

21. A method according to claim 1 in which (i) the first projection screen is located a first distance from the at least one patron seat and (ii) the action of providing a second projection screen comprises locating the second projection screen at a distance from the at least one patron seat less than the first distance.

22. A method according to claim 1 in which (i) the multiplex theatre hall has a rear wall and (ii) the action of providing at least one patron seat location comprises providing a forwardmost row of patron seats near the rear wall, further comprising disabling from use at least some of the patron seats of the forwardmost row of patron seats prior to projecting the image over a major portion of the second projection screen.

23. A method according to claim 22 in which the action of disabling from use at least some of the patron seats of the forwardmost row of patron seats comprises disabling from use all of the patron seats of the forwardmost row of patron seats.

24. A method according to claim 1 in which the multiplex theatre hall has a rear wall, further comprising providing an emergency screen access system comprising an emergency exit door between the second projection screen and the rear wall.

25. A method according to claim 24 in which (i) the second projection screen comprises first and second portions and (ii) the emergency screen access system further comprises means for moving the first portion of the second projection screen relative to the second portion of the second projection screen.

26. A method according to claim 1 in which the multiplex theatre hall has a rear wall, further comprising (i) providing at least one loudspeaker for producing sound within the multiplex theatre hall and (ii) providing a sound absorbing acoustic barrier between the second projection screen and the rear wall.

27. A method according to claim 1 in which (i) the first projection screen has a first horizontal radius of curvature and (ii) the action of providing a second projection screen comprises providing the second projection screen having a horizontal radius of curvature less than the first horizontal radius of curvature.

28. A method according to claim 27 in which (i) the first projection screen has a first vertical radius of curvature and (ii) the action of providing a second projection screen comprises providing the second projection screen having a vertical radius of curvature less than the first vertical radius of curvature.

29. A method according to claim 1 in which (i) the first projection screen has a first horizontal width and (ii) the action of providing a second projection screen comprises providing the second projection screen having a horizontal width greater than the first horizontal width.

30. A method according to claim 29 in which (i) the multiplex theatre hall further comprises spaced first and second walls and (ii) the second projection screen extends substantially the distance between the first and second walls.

31. A method according to claim 1 in which the action of providing a second projection screen comprises tilting the second projection screen so that it is not oriented vertically.

32. A method according to claim 1 in which (i) the first projection screen has a first vertical height and (ii) the action of providing a second projection screen comprises providing the second projection screen having a vertical height greater than the first vertical height.

33. A method according to claim 32 in which the multiplex theatre hall has a ceiling and a floor spaced from the ceiling, further comprising modifying the distance between the floor and the ceiling prior to providing the second projection screen.

34. A method according to claim 32 in which (i) the multiplex theatre hall further comprises a ceiling and a floor spaced from the ceiling and (ii) the second projection screen extends substantially the distance between the ceiling and floor.

35. A method according to claim 1 in which the minimum vertical field of view of the image for the patron is approximately thirty degrees.

36. A method according to claim 1 in which the vertical field of view of the image for the patron is at least approximately forty degrees.

37. A method according to claim 1 in which (i) the multiplex theatre hall has a rear wall, (ii) the action of providing at least one patron seat location comprises providing a forwardmost row of patron seats near the rear wall, and (iii) the vertical field of view of the image for the patron is at least approximately eighty degrees.

38. A method according to claim 1 in which the action of projecting the image over a major part of the second projection screen also increases horizontal field of view of the image for the patron, with the minimum horizontal field of view being approximately fifty-five degrees.

39. A method according to claim 1 in which the action of projecting the image over a major part of the second projection screen also increases horizontal field of view of the image for the patron to approximately seventy-five degrees.

40. A method according to claim 1 in which (i) the multiplex theatre hall has a rear wall, (ii) the action of providing at least one patron seat location comprises providing a forwardmost row of patron seats near the rear wall, and (iii) the action of projecting the image over a major part of the second projection screen also increases horizontal field of view of the image for the patron to approximately one hundred thirty degrees.

41. A method according to claim 1 further comprising projecting an image onto the first projection screen prior to providing the second projection screen, the vertical field of view of the image projected onto the second projection screen for the patron being at least approximately sixty percent larger than the vertical field of view of the image projected onto the first projection screen.

42. A method according to claim 1 in which the action of projecting the image over a major part of the second projection screen also increases horizontal field of view of the image for the patron, further comprising projecting an image onto the first projection screen prior to providing the second projection screen, the horizontal field of view of the image projected onto the second projection screen for the patron being at least approximately thirty-five percent larger than the horizontal field of view of the image projected onto the first projection screen.

43. A method according to claim 1 in which the action of projecting the image over a major portion of the second projection screen comprises projecting at least one 2D image and at least one image configured for viewing by a 3D viewing system.

44. A method according to claim 1 in which the first projection screen has a first size and the action of providing a second projection screen comprises providing the second projection screen having a size greater than the first size.

* * * * *